United States Patent
Nayak et al.

(10) Patent No.: US 10,976,795 B2
(45) Date of Patent: Apr. 13, 2021

(54) CENTRALIZED POWER LOSS MANAGEMENT SYSTEM FOR DATA STORAGE DEVICES

(71) Applicant: Seagate Technology LLC, Cupertino, CA (US)

(72) Inventors: Deepak Nayak, Mumbai (IN); Hemant Mohan, Pune (IN); Rajesh Maruti Bhagwat, Pune (IN)

(73) Assignee: Seagate Technology LLC, Fremont, CA (US)

( * ) Notice: Subject to any disclaimer, the term of this patent is extended or adjusted under 35 U.S.C. 154(b) by 175 days.

(21) Appl. No.: 16/398,664

(22) Filed: Apr. 30, 2019

(65) Prior Publication Data

US 2020/0348742 A1 Nov. 5, 2020

(51) Int. Cl.
| | |
|---|---|
| *G06F 1/30* | (2006.01) |
| *G06F 9/54* | (2006.01) |
| *H02J 9/06* | (2006.01) |
| *G06F 1/28* | (2006.01) |

(52) U.S. Cl.
CPC ............. *G06F 1/30* (2013.01); *G06F 1/28* (2013.01); *G06F 9/542* (2013.01); *H02J 9/061* (2013.01)

(58) Field of Classification Search
CPC .... G06F 1/30; G06F 1/28; G06F 9/542; H02J 9/061
USPC .......................................... 710/313; 713/300
See application file for complete search history.

(56) References Cited

U.S. PATENT DOCUMENTS

| | | | |
|---|---|---|---|
| 3,906,453 A * | 9/1975 | Mattedi | G06F 13/4243 711/107 |
| 5,862,393 A * | 1/1999 | Davis | G06F 1/3215 710/302 |
| 5,983,298 A * | 11/1999 | Schultz | G06F 13/4081 710/302 |
| 8,601,597 B2 | 12/2013 | Chan et al. | |
| 9,323,670 B2 | 4/2016 | Krishnamurthy et al. | |
| 9,383,795 B2 | 7/2016 | Stenfort | |
| 9,588,565 B1 * | 3/2017 | Harland | G06F 11/34 |
| 9,632,935 B2 * | 4/2017 | Cherian | G06F 1/3275 |
| 10,003,200 B2 | 6/2018 | Buddle | |
| 10,114,353 B2 | 10/2018 | Slessman | |
| 10,198,320 B2 | 2/2019 | Alcorn et al. | |

(Continued)

OTHER PUBLICATIONS

Ahmadian, Saba et al., "Investigating power outage effects on reliability of solid-state drives," Data Storage, Networks, and Processing (DSN) Lab, Department of Computer Engineering Sharif University of Technology, arXiv:1805.00140v1 [cs.OH], Apr. 29, 2018, 6 pages.

*Primary Examiner* — Paul R. Myers
(74) *Attorney, Agent, or Firm* — Westman, Champlin & Koehler, P.A.

(57) ABSTRACT

A power management circuit includes at least one energy storage device and a power controller coupled to the at least one energy storage device. The power controller is configured to enable temporary power to be provided from the at least one energy storage device to a plurality of data storage devices upon a system power loss event. The power controller is further configured to receive a power loss indication signal associated with any individual one of the plurality of data storage devices and responsively enable power loss protection for the data storage device.

20 Claims, 7 Drawing Sheets

(56) References Cited

U.S. PATENT DOCUMENTS

| | | |
|---|---|---|
| 2012/0151162 A1* | 6/2012 | Trantham .............. G06F 1/3206 |
| | | 711/161 |
| 2012/0284561 A1 | 11/2012 | Wilson |
| 2014/0195718 A1* | 7/2014 | Abraham ............ G06F 12/0804 |
| | | 711/103 |
| 2014/0219021 A1 | 8/2014 | Trantham et al. |
| 2014/0281151 A1* | 9/2014 | Yu ........................... G06F 3/064 |
| | | 711/103 |
| 2015/0029808 A1 | 1/2015 | Allison et al. |
| 2015/0212496 A1* | 7/2015 | Tanabe ..................... G05B 9/02 |
| | | 307/328 |
| 2015/0378415 A1 | 12/2015 | George |
| 2016/0019160 A1* | 1/2016 | Mohan ................ G06F 12/0246 |
| | | 711/208 |
| 2016/0139982 A1 | 5/2016 | Yu et al. |
| 2016/0268000 A1 | 9/2016 | Thompson et al. |
| 2016/0283156 A1* | 9/2016 | Kufeldt ............... G06F 12/0238 |
| 2016/0283336 A1* | 9/2016 | Petersen ................... G06F 1/30 |
| 2017/0091042 A1 | 3/2017 | Chou et al. |
| 2017/0344279 A1* | 11/2017 | Shen ..................... G06F 3/0619 |
| 2018/0032390 A1* | 2/2018 | Rahmanian ............... G06F 1/30 |
| 2019/0129836 A1* | 5/2019 | Boyle ................... G06F 1/3243 |

* cited by examiner

CENTRALIZED POWER LOSS MANAGEMENT SYSTEM FOR DATA STORAGE DEVICES

SUMMARY

In one embodiment, a power management circuit is provided. The power management circuit includes at least one energy storage device and a power controller coupled to the at least one energy storage device. The power controller is configured to enable temporary power to be provided from the at least one energy storage device to a plurality of data storage devices upon a system power loss event. The power controller is further configured to receive a power loss indication signal associated with any individual one of the plurality of data storage devices and responsively enable power loss protection for the data storage device.

In another embodiment, a method is provided. The method includes detecting a system power loss event and responsively enabling temporary power to be provided from at least one energy storage device to at least one of a plurality of data storage devices. The method also includes receiving a power loss indication signal associated with any individual one of the plurality of data storage devices and responsively enabling power loss protection for the data storage device.

In yet another embodiment, a system is provided. The system includes a plurality of data storage devices with each data storage device having a main memory and a cache memory. The system also includes a power management circuit coupled to each of the plurality of data storage devices. The power management circuit is configured to detect a system power loss event that results in a reduction of power supplied to the plurality of data storage devices and responsively provide the plurality of data storage devices with temporary power. The temporary power enables the plurality of data storage devices to flush volatile data from individual ones of the plurality of cache memories into respective individual ones of the plurality of main memories. The power management circuit is further configured to receive a power loss indication signal associated with any individual one of the plurality of data storage devices and responsively enable power loss protection for the data storage device.

This summary is not intended to describe each disclosed embodiment or every implementation of the centralized power loss management system for data storage devices. Many other novel advantages, features, and relationships will become apparent as this description proceeds. The figures and the description that follow more particularly exemplify illustrative embodiments.

DETAILED DESCRIPTION

Embodiments described below relate to a centralized power loss management system for data storage devices (DSDs).

DSDs are typically included in systems having one or more host computers. Examples of DSDs include hard disk drives (HDDs), which are electromechanical devices containing spinning discs and movable read/write heads, solid state drives (SSDs), which use memory chips and contain no moving parts, hybrid drives, which combine features of HDDs and SSDs in one unit, and NVDIMMs, which are similar to SSDs but are on the main memory bus of a computer's CPU.

A DSD may include non-volatile main memory, volatile cache memory and control circuitry (e.g., data storage management circuitry). Additionally, current DSDs may include a circuit that detects a power loss in the DSD and responsively carries out operations to prevent any loss of volatile data, which may be present in the volatile cache memory. The operations may include providing temporary power from within the DSD to enable flushing of the cache memory.

HDDs may use back electromotive force generated during spin-down of the discs upon power loss to provide the temporary power for volatile cache flushing. Hybrid drives may carry out data protection upon power loss in a similar manner as HDDs.

SSDs may employ high-speed volatile memory (such as SDRAM) as high-speed cache. To help ensure that volatile data is not corrupted and/or lost on a sudden power loss, the SDRAM and other SSD circuitry is typically temporarily powered by on-board capacitors upon power loss. These on-board capacitors are costly and occupy space within the SSD.

For systems (such as storage enclosures, storage arrays, storage servers, data centers, etc.) that include a plurality of DSDs (e.g., SSDs), embodiments of the disclosure provide a system-level power loss management circuit that obviates a need for drive-level power loss management circuitry (e.g., on-board capacitors) within each individual DSD (e.g., SSD) of the plurality of DSDs (e.g., SSDs). System-level power loss management in accordance with one embodiment is described below in connection with FIG. 1A.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1A:
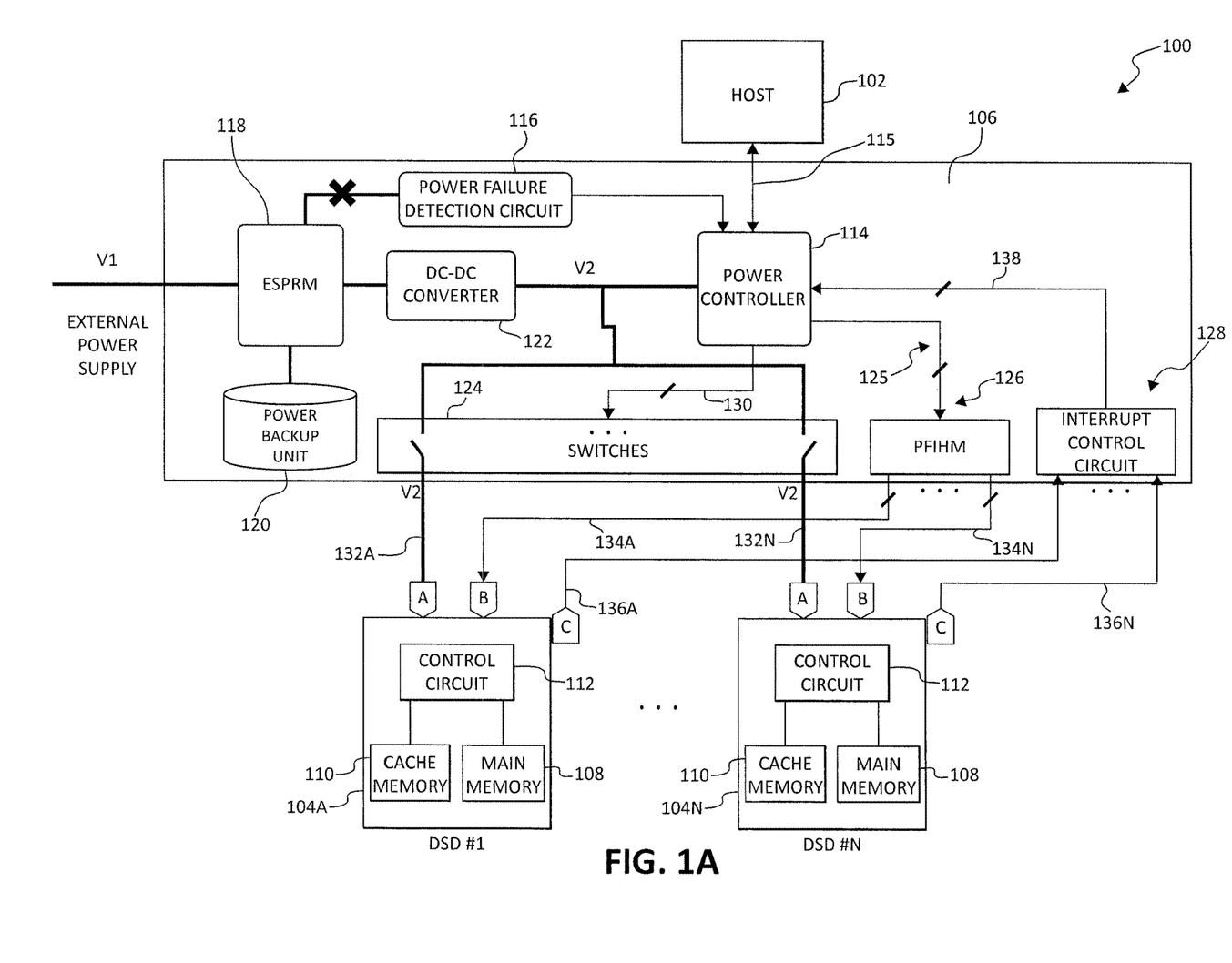
FIG. 1A is a block diagram of a data storage system that includes a power management circuit in accordance with one embodiment.

FIG. 1A is a block diagram of a data storage system 100 that includes a power management circuit in accordance with one embodiment. System 100 includes a host 102, a plurality of DSDs 104A-104N and a power management circuit 106. In embodiments in which system 100 is a part of data center, host 102 may be, by way of example only and not by way of limitation, a main host central processing unit (CPU), a host bus adapter (HBA) CPU, an input/output controller (IOC) CPU, an input/output module (IOM) CPU, an expander controller having, for example, a serial attached small computer system interface (SCSI/SAS/SATA/Ethernet etc.) topology, a switch controller having, for example, a peripheral component interconnect topology (PCIe), a system enclosure processor (SEP) controller, a generic enclosure management controller or combinations thereof. DSDs 104A-104N may include SSDs, HDDs, hybrid drives, non-volatile dual inline modules (NVDIMMs), etc. In one embodiment, each of DSDs 104A-104N may include a non-volatile main memory 108, volatile cache memory 110 and a DSD control circuit 112 that carries out data storage management.

Power management circuit 106 includes a power controller 114, a power failure detection circuit 116, an energy storage and power release management (ESPRM) circuit 118, a power backup unit 120, a direct current (DC)-DC converter (e.g., a buck-boost converter) 122, switches (e.g., a bank of solid-state switches) 124, a power failure instruction handling module (PFIHM) 126, and an interrupt control circuit 128.

Power management circuit 106 further includes single connectors and/or bus connections (e.g., with each bus connection having multiple single connectors) that provide coupling for power and/or signal transmission between different elements of power management circuit 106. An external power supply at a first voltage level (V1) is coupled to ESPRM circuit 118. ESPRM circuit 118 is also coupled to power backup unit 120. Power backup unit 120 may include any suitable number and type(s) of energy storage device(s). In one embodiment, power backup unit 120 includes at least one capacitor (e.g., a supercapacitor or other suitable type of capacitor) and at least one battery (e.g., a lithium-ion battery) that outputs a backup voltage to ESPRM circuit 118. A first output of ESPRM circuit 118 is coupled to power failure detection circuit 116 which, upon detection of a power failure at the ESPRM circuit 118 output, provides a power failure indication signal to power controller 114. A second output of ESPRM circuit 118 is coupled to an input of DC-DC converter 122, which provides a second voltage level (V2) as an output. The output of DC-DC converter 122 is coupled to switches 124 and to power controller 114. Power controller 114 is coupled to switches 124 via a power switch bus 130, and is configured to control power provided to each of DSDs 104A-104N by sending switch control signals via power switch bus 130. Power connection lines 132A-132N couple different switches 124 to connector A of respective ones of DSDs 104A-104N. As indicated above, in one embodiment, switches 124 may be solid-state switches. In such an embodiment, switches 124 may be controlled from power controller 114 by using a bit-mask employing, for example, N bits of data (where N is equal to the number of DSDs). Different individual bits of the N bits may be set either on (e.g., "1"), off (e.g., "0") or inverted from on to off (or vice versa), in a single bitwise operation. In some such embodiments, bit-mask values may be sent by host 102 to power controller 114, which may use the host-communicated bit-mask values to control switches 124. Communication between host 102 and power controller 114 may take place via a communication bus 115. In one embodiment, communication bus 115 may be a bi-directional serial bus (e.g., a universal asynchronous receiver-transmitter (UART) bus, a serial peripheral interface (SPI) bus, an inter-integrated circuit (I2C) bus, etc.). In some embodiments, power controller 114 may communicate DSD 104A-104N status information (e.g., active/inactive status information) to host 102 via bus 115.

In some embodiments, power controller 114 is also configured to provide instructions to external devices (e.g., DSDs 104A-104N) upon occurrence of a power loss. The instructions may be for the external device (e.g., DSDs 104A-104N) to carry out a cache flushing operation, for the external device to enter into a low-power mode (e.g., a self-refresh mode that substantially reduces power utilization by the DSDs 104A-104N while keeping volatile contents intact), etc. The power controller 114 sends the instructions such as cache flushing, low power mode, etc. for the downstream DSDs 104A-104N over a communication channel 125. The PFIHM 126 routes the instructions appropriately over a set of communication channels (e.g., power failure instruction buses) 134A-134N by recognizing the destination DSD field in the instruction(s). In one embodiment, each of the power failure instruction buses 134A-134N may include at least one connection line. In one example, two connection lines are employed. A first of these connection lines may be utilized to communicate a cache flushing instruction to the respective DSD 104A-104A and a second connection line may be utilized to communicate a low-power mode instruction. The communication may involve setting instruction bits to a "0" or a "1". For example, when there is no power loss in system 100, both the cache flushing instruction bits and the low-power mode instruction bits may be set to "0", thereby indicating to DSDs 104A-104N that normal operation can continue. When there is power loss in the system 100, at least some of the cache flushing bits and/or at least some of the low-power mode instruction bits may be set to "1".

In response to an individual one of DSDs 104A-104N sensing that the cache flushing instruction bit is set to "1", that DSD flushes its volatile cache memory 110. Similarly, in response to an individual one of DSDs 104A-104N sensing that the low-power mode instruction bit is set to "1", that DSD enters into a low-power mode (e.g., a self-refresh mode). It should be noted that, depending on power backup unit 120 capacity, different embodiments may either provide backup power for all DSDs 104A-104N (referred to herein as full backup) or provide backup power for a subset (e.g., less than all) of DSDs 104A-104N (referred to herein as partial backup). In some embodiments, power controller 114 may determine that a subset of DSDs 104A-104N have been inactive for at least a predetermined time period and therefore can be turned off upon power loss to system 100 without backup. Upon system 100 power loss, individual ones of switches 124 corresponding to the DSDs determined to be inactive may be turned off using, for example, the bit-mask technique discussed above. When an individual one of DSDs 104A-104N is turned off, values (e.g., "0" or "1") of any instruction bits for that DSD are irrelevant.

DSDs 104A-104N and/or drive carriers that hold DSDs 104A-104N in a data center enclosure may also send communication signals (e.g., interrupt signals) to power management circuit 106 via suitable connectors (shown as connector C in FIG. 1A) and connection lines 136A-136N. In system 100, connection lines 136A-136N are coupled to interrupt control circuit 128, which may combine interrupts from different ones of DSDs 104A-104N and send the signal to power controller 114 via interrupt communication bus 138. Details regarding the sending of interrupt signals from carriers of DSDs 104A-104N to power management circuit 106 and responsive action taken by power management circuit 106 are described below in connection with FIG. 1B.

Figure 1B:
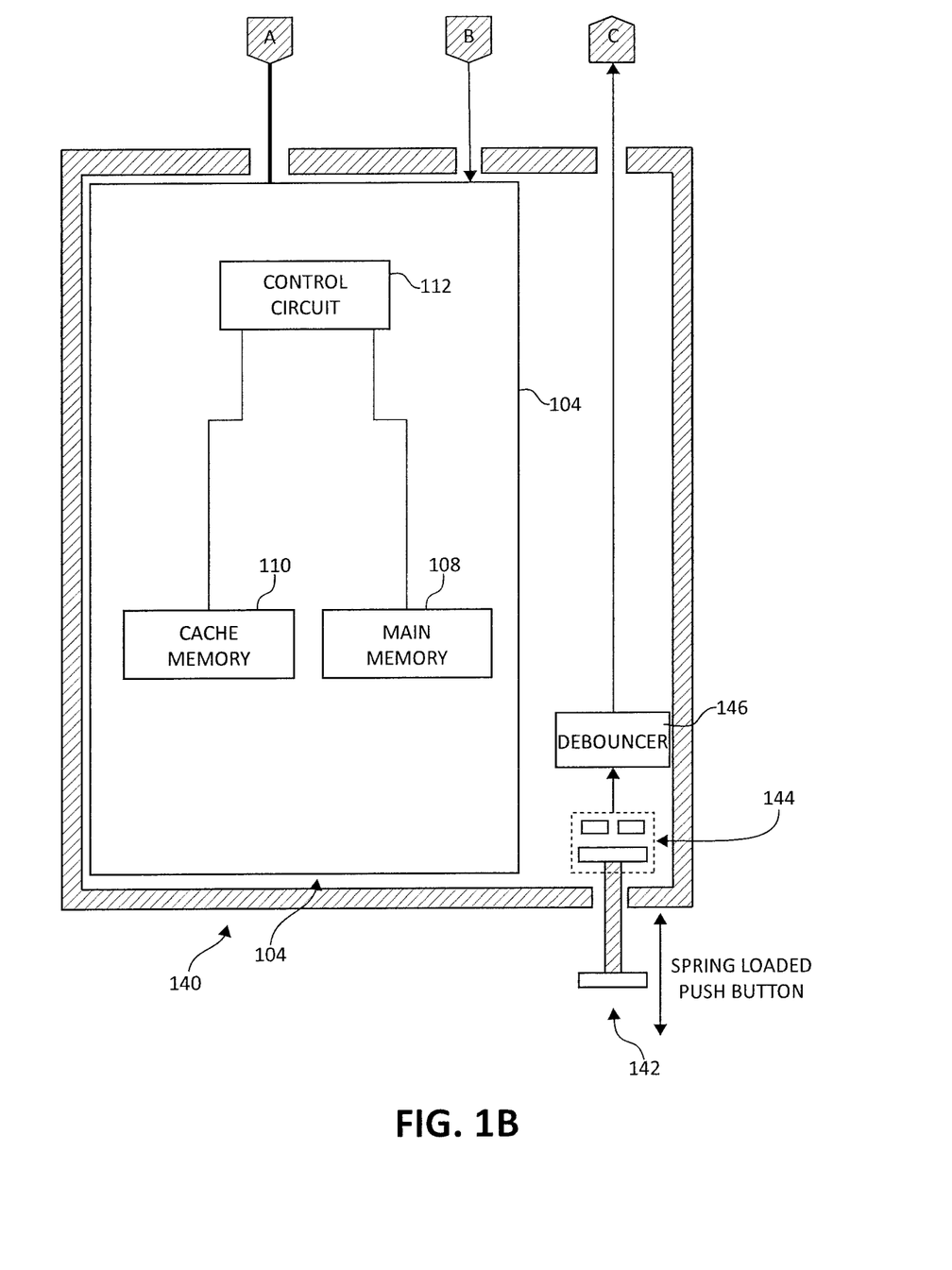
FIG. 1B is a diagrammatic illustration of a data storage device installed in a carrier in accordance with one embodiment.

FIG. 1B is a diagrammatic illustration of DSD 104 installed in a carrier 140 in accordance with one embodiment. In one embodiment, carrier 140 may be in a data center enclosure (not shown) that includes a number of DSDs and carriers for the respective DSDs. Hot plugging/unplugging of DSD 104 of system 100 may be carried out by opening/closing carrier 140 and installing/removing DSD 104. In the embodiment of FIG. 1B, removal of DSD from carrier 140 may be carried out by depressing a push button 142 of carrier 140 and then manually disengaging the DSD 104. Push button 142 is coupled to a plunger/switch 144 that makes contact with a switch debouncer 146 when the push button 142 is depressed. When the switch 144 comes in contact with debouncer 146, a drive detached interrupt is sent to interrupt control circuit 128 via communication line 136. Interrupt control circuit 128 responsively forwards an appropriate signal to power controller 114. Upon receiving the signal, power controller 114 sends a cache flushing instruction (e.g., sets cache flushing instruction bit to "1") to DSD 104. In response to receiving the cache flushing instruction, control circuit 112 of DSD 104 flushes volatile cache memory 110. It should be noted that an inherent delay (e.g., about 1-2 seconds) between depressing push button 142 and mechanically disengaging DSD 104 helps ensure that DSD 104 is powered up for at least about 20 milliseconds after receiving the cache flushing signal, thereby allowing for completion of the cache flushing operation. It should be noted that the plunger switch 144 is only an example and any other suitable switch arrangement that is activated just prior to mechanical disengagement of DSD 104 may be employed.

Figure 2:
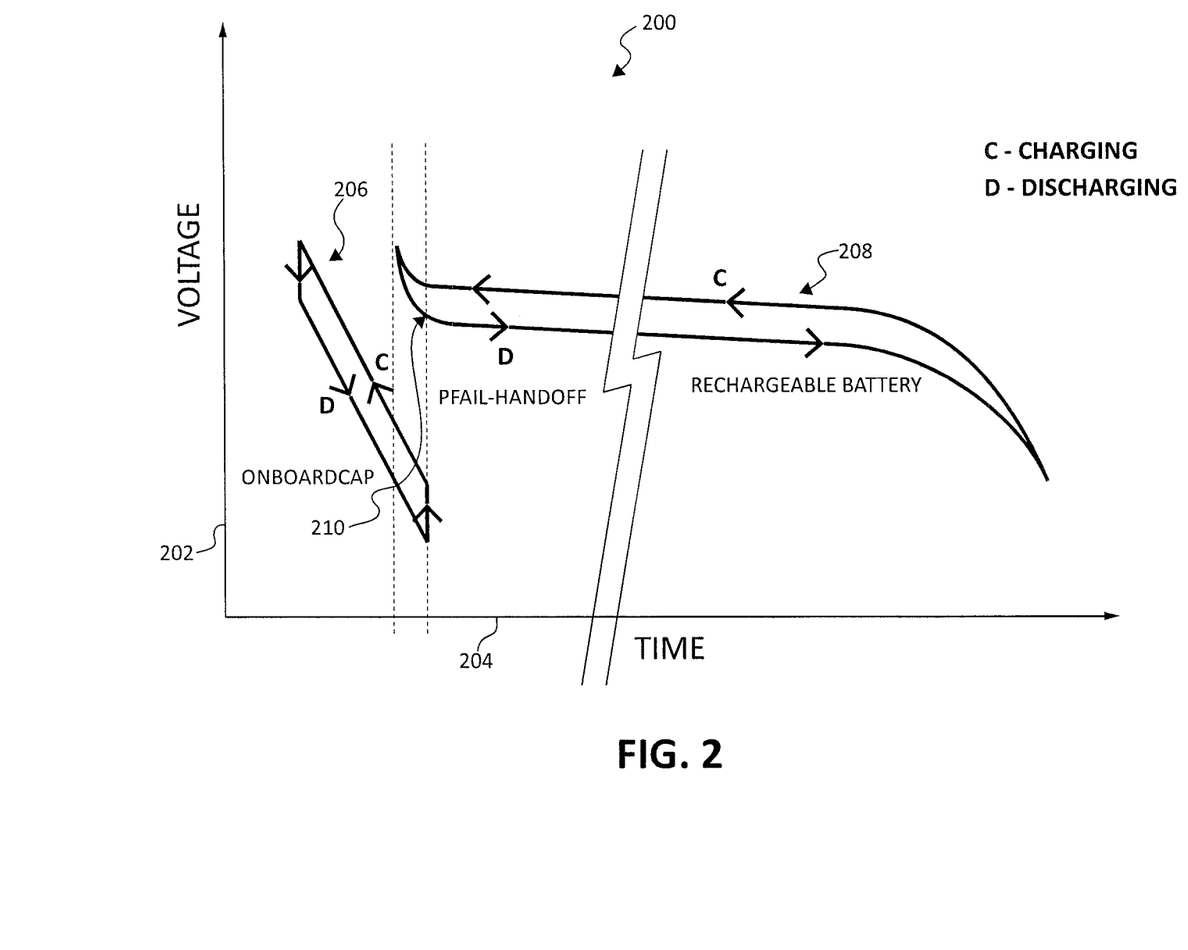
FIG. 2 is a graph illustrating charging and discharging of a capacitor and a rechargeable battery employed in a power backup unit in accordance with one embodiment.

FIG. 2 is a graph 200 illustrating charging and discharging of a capacitor and a rechargeable battery employed in power backup unit 120 in accordance with one embodiment. In graph 200, vertical axis 202 represents voltage and horizontal axis 204 represents time. In a particular embodiment, power backup unit 120 is configured such that the capacitor acts as the initial backup power source, and the battery provides the backup power after the capacitor voltage falls to or below a threshold backup voltage level (e.g., a minimum voltage level for power controller 114 and other components of power management circuit 106 to be operational). In FIG. 2, plot 206 represents the capacitor charge/discharge cycle and plot 208 represents the battery charge/discharge cycle. In plot 206, point 210 is a "handoff" point at which the battery takes over the function of providing the backup power from the capacitor.

As indicated herein, depending on power backup unit 120 capacity, either full or partial power backup may be provided. Examples of different power backup method embodiments for a plurality N of DSDs are provided below.

For N DSDs, let B be the number of DSDs for which backup is budgeted.
(N-B) DSDs are thus not budgeted for backup.
For a full backup, B=N and therefore (N-B)=0.
The B, (N-B) DSD combination may be handled in various ways:
Method embodiment 1: Power B DSDs, power off (N-B) DSDs, and wait for B DSDs to flush (described below in connection with FIG. 3A).
Method embodiment 2: Power B DSDs, low-power (N-B) DSDs, wait for B DSDs to flush, power off B DSDs, power each (N-B) DSD one-by-one (or in pairs, triads, etc.) to let the DSD(s) flush, as per a host-defined policy and/or as long as power lasts (described below in connection with FIG. 3B).
Method embodiment 3: Low-power all N DSDs, power up B followed by (N-B) DSDs one-by-one (or in pairs, triads, etc.) letting each DSD flush, as per a host-defined policy and/or as long as power lasts (described below in connection with FIG. 3C).

The host-defined policy may combine any/all of the following schemes:
1. Host 102 suggests bit-mask values to power controller 114 periodically for turning different combinations of switches 124 on/off (depending on DSDs activity).
2. Host 102 pre-defines priority for DSD power backup.
   e.g., boot DSDs at high power backup priority, spare redundant array of independent discs (RAID) DSDs at low power backup priority, etc.
3. Queues in FIGS. 3B and 3C (described further below) may have sub-queue(s) for B and/or sub-queue(s) for (N-B) DSDs.

Figure 3A:
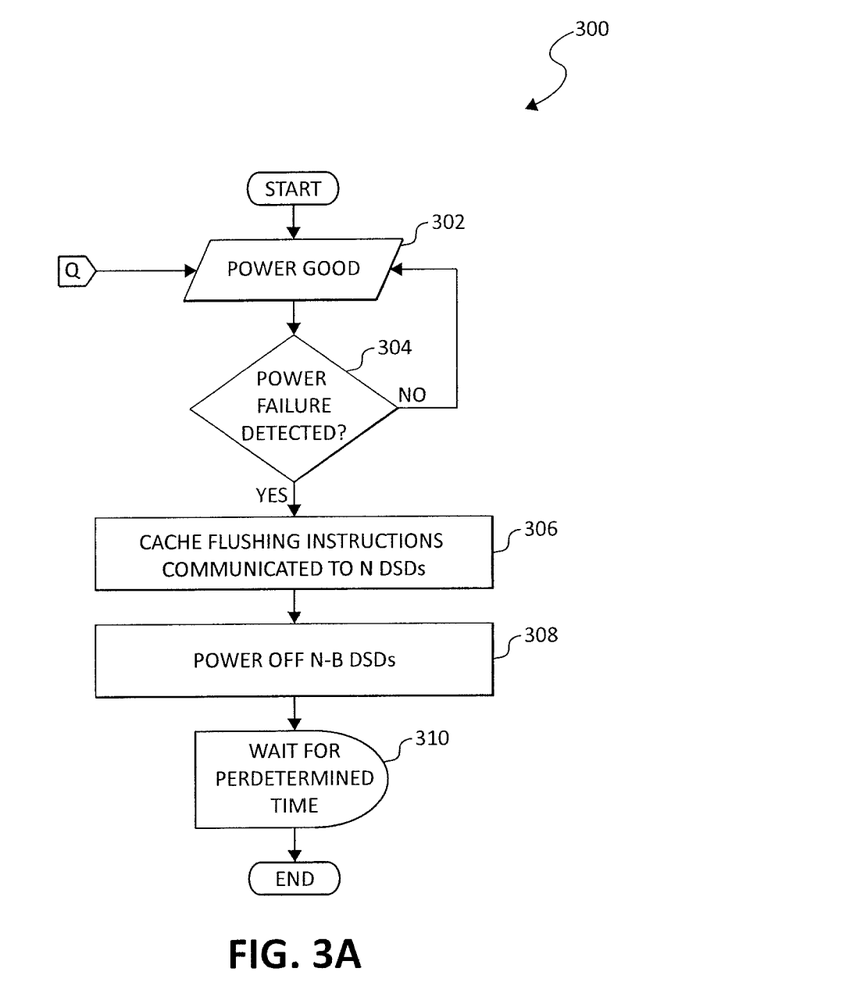
FIG. 3A-3D are flowcharts of method embodiments.

FIG. 3A is a flowchart of a first method 300 (method embodiment 1 above). The method 300 starts with a power good state at 302 in which all DSDs are powered on. As described earlier in connection with FIG. 1A, all N DSDs may be powered on by power controller 114 setting all N data bits of a bit-mask for controlling switches 124 to "1", for example. Also, in the power good state in which there is no power loss in system 100, both the cache flushing instruction bits and the low-power mode instruction bits may be set to "0", for example, thereby indicating to DSDs 104A-104N that normal operation can continue. At 304, system power failure detection is carried out by, for example, power failure detection circuit 116 of FIG. 1A. If no power failure is detected, control returns to 302. If power failure is detected at 304, cache flushing instructions are communicated to the DSDs at 306 by, for example, power controller 114 setting cache flushing instruction bits to "1". At 308, (N-B) DSDs are powered off by, for example, power controller 114 setting N-B data bits of the bit-mask for controlling switches 124 to "0". At 310, the system waits for a predetermined time for cache flushing operations in the B DSDs to complete. The method ends at completion of the predetermined wait time.

Figure 3B:
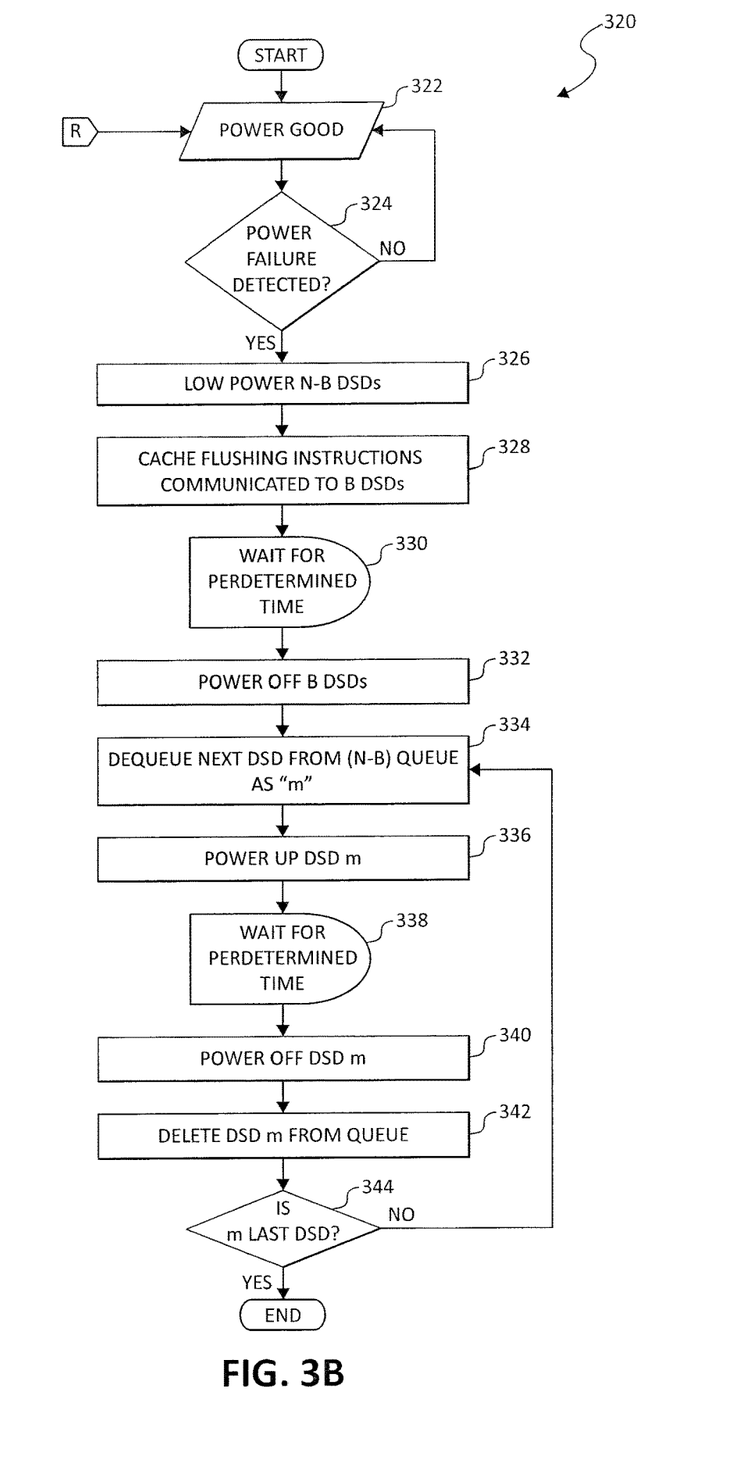

FIG. 3B is a flowchart of a second method 320 (method embodiment 2 above). As in the method 300 of FIG. 3A described above, method 320 starts with a power good state at 322 in which all DSDs are powered on. At 324, system power failure detection is carried out. If no power failure is detected, control returns to 322. If power failure is detected at 324, (N-B) DSDs are instructed to enter a low-power mode by, for example, power controller 114 setting N-B low-power mode instruction bits to "1" at 326. At 328, cache flushing instructions are communicated to the B DSDs. At 330, the system waits for a predetermined time for cache flushing operations in the B DSDs to complete. At 332, the B DSDs are powered off by, for example, power controller 114 setting B data bits of the bit-mask for controlling switches 124 to "0". Then, the remaining N-B DSDs are placed in a queue, and are powered in order of the queue and allowed to flush (at 334-344), as per a host-defined policy and/or as long as power lasts. Specifically, at 334, a next DSD from the N-B queue at place "m" in the queue is dequeued. At 336, the DSD m is taken out of low-power mode by, for example, power controller 114 setting the DSD m low-power mode instruction bit to "0". At 338, the system waits for a predetermined time for a cache flushing operation in the DSD m to complete. At 340, the DSD m is powered off by, for example, power controller 114 setting the DSD m data bit of the bit-mask for controlling the DSD m switch 124 to "0". At 342, the DSD m is deleted from the queue. At 344, a determination is made as to whether the DSD m is the last DSD in the queue. If the DSD m is not the last DSD in the queue, control returns to 334. If DSD m is the last DSD in the queue, the process ends. While powering up a single DSD m is discussed, it should be understood that DSDs of the (N-B) DSDs may be powered and flushed in groups (such as pairs, triads, etc.) without departing from the scope of the disclosure.

Figure 3C:
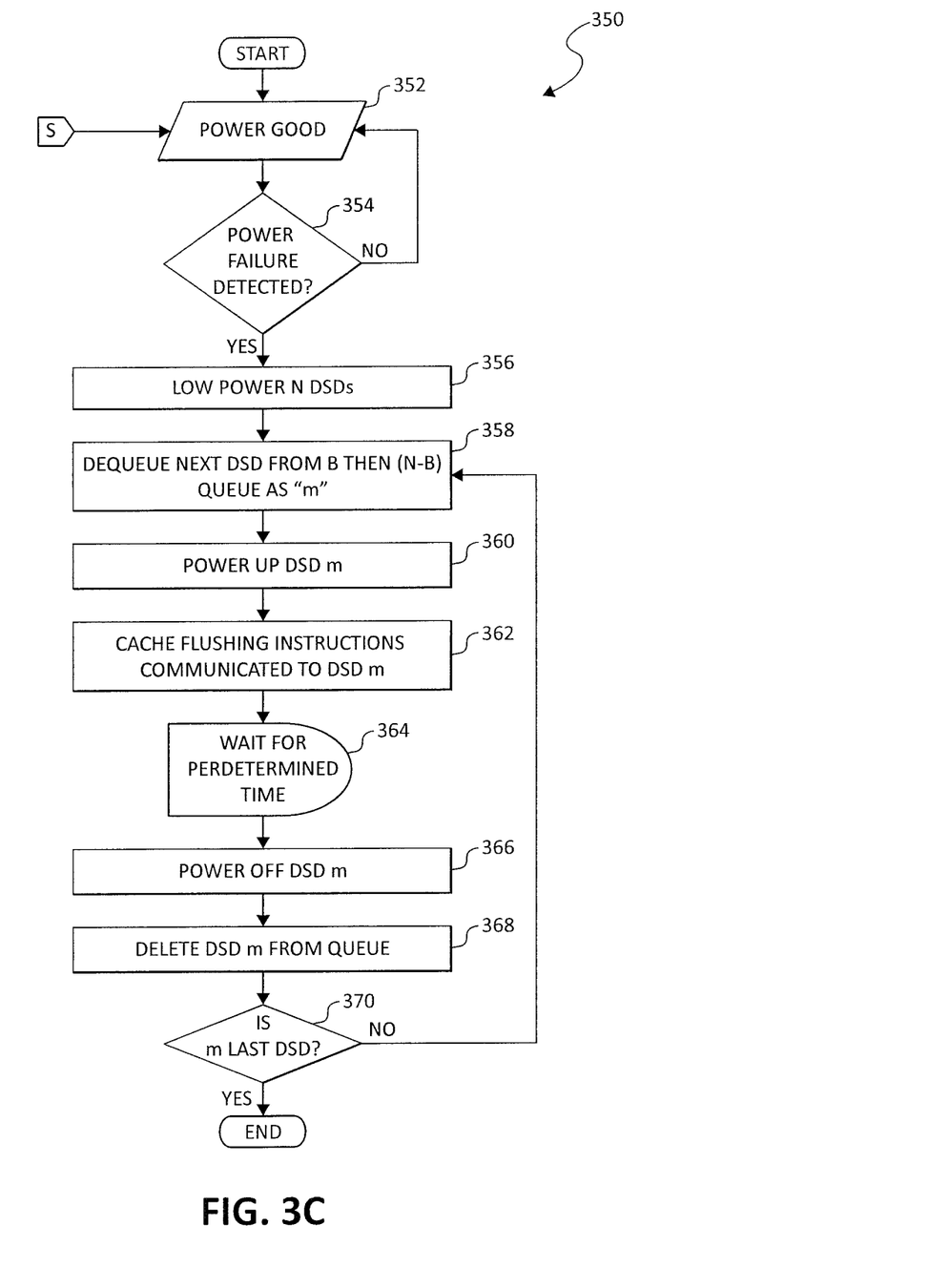

FIG. 3C is a flowchart of a third method 350 (method embodiment 3 above). Method 350 starts with a power good state at 352 in which all DSDs are powered on. At 354, system power failure detection is carried out. If no power failure is detected, control returns to 352. If power failure is detected at 354, all the N DSDs are instructed to enter a low-power mode at 356. Then B followed by (N-B) DSDs are powered up one-by-one letting each DSD flush its respective cache (at 358-370). Specifically, at 358, a next DSD from the B and then N-B queue at place "m" in the queue is dequeued. At 360, the DSD m is taken out of the low-power mode. At 362, cache flushing instructions are communicated to DSD m. At 364, the system waits for a predetermined time for a cache flushing operation in the DSD m to complete. At 366, the DSD m is powered off. At 368, the DSD m is deleted from the queue. At 370, a determination is made as to whether the DSD m is the last DSD in the queue. If the DSD m is not the last DSD in the queue, control returns to 360. If DSD m is the last DSD in the queue, the process ends. While powering up a single DSD m is discussed, it should be understood that DSDs of the N DSDs may be powered and flushed in groups (such as pairs, triads, etc.) without departing from the scope of the disclosure.

Figure 3D:
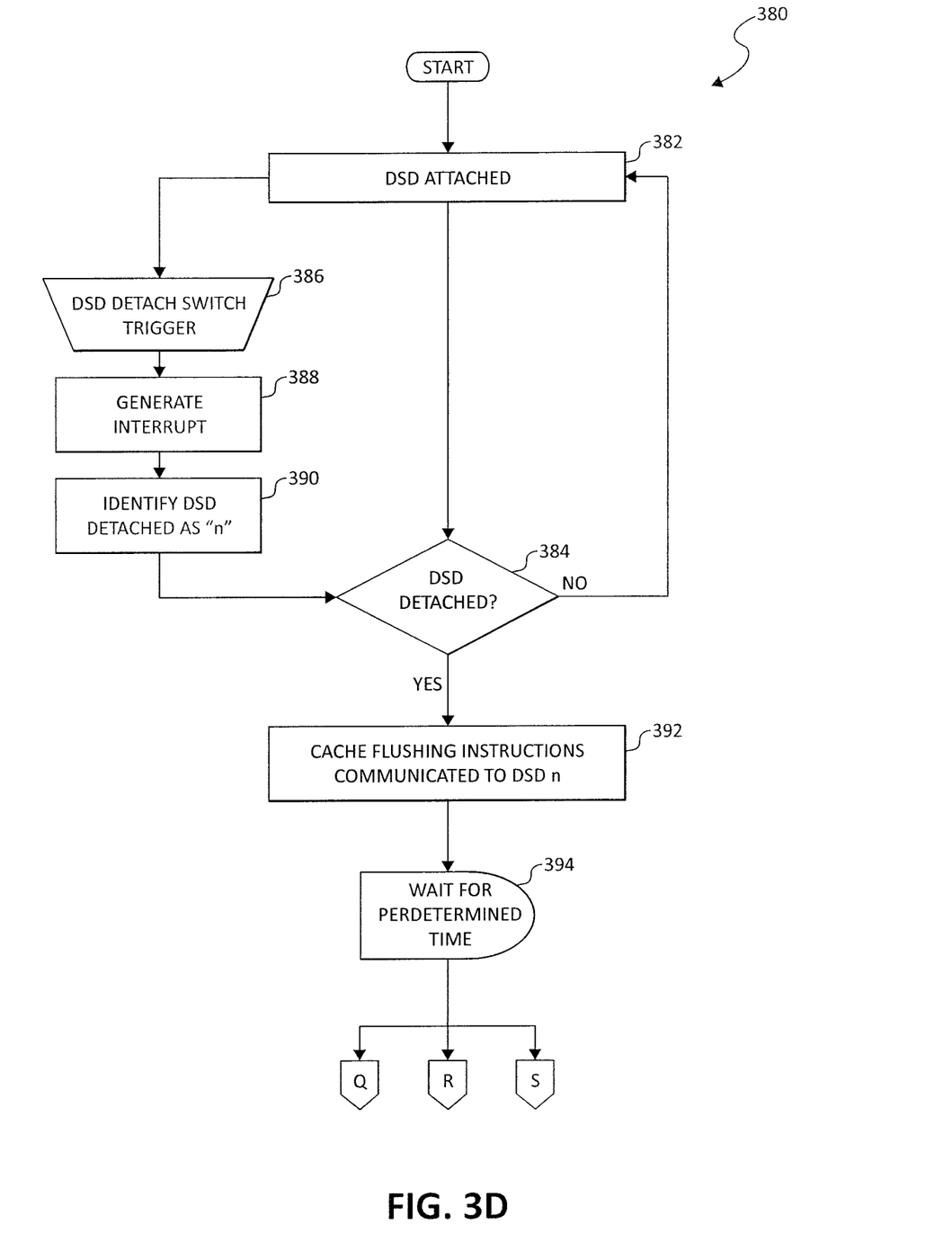

FIG. 3D is a flowchart of a fourth method embodiment 380. Method 380 starts at 382 with a DSD attached or in a connected state. At 384, DSD detachment detection is carried out. In one embodiment, the DSD detachment detection is performed by power controller 114 of FIG. 1A, which may actively or passively monitor a connection state of the DSD. Power controller 114 may either detect no DSD detachment, which is indicated by a return of control to 382, or may determine that the DSD is detached based on information about a change in the connection state of the DSD from attached to detached. For example, while the active or passive monitoring is being carried out by power controller 114, a DSD detachment switch may be triggered at 386 (e.g., when push button 142 of FIG. 1B is depressed and plunger/switch 144 attached to push button 142 makes contact with a switch debouncer 146). This results in, for example, a signal being sent from carrier 140 to interrupt control circuit 128, which generates an interrupt at 388 and identifies the detached DSD as "n" at 390. The interrupt with the DSD identifier n are sent to power controller 114, which determines that DSD n is detached based on the information received. At 392, cache flushing instructions are communicated to DSD n by, for example, power controller 114 setting a cache flushing instruction bit for DSD n to "1". At 394, the system waits for a predetermined time for cache flushing operations in DSD n to complete. In FIG. 3D, "Q", "R" and "S", are connectors to the flowcharts of FIGS. 3A, 3B and 3C, respectively. These connections between all flowcharts thus described above cover both system-triggered as well as DSD triggered data hardening methods. Although a single detached DSD is discussed, it should be understood that DSDs may be detached in groups (such as pairs, triads, etc.) without departing from the central concept of the disclosure.

The above-disclosed subject matter is to be considered illustrative, and not restrictive, and the appended claims are intended to cover all such modifications, enhancements, and other embodiments, which fall within the true scope of the present disclosure. For instance, embodiments could also include handling a DSD's mechanical disengagement just after a power failure event, in which case the system could prioritize inclusion of this particular DSD for cache flushing in any of the flowcharts (3A to 3D). Further, different communication lines, buses, communication channels, etc. described above may be wired or wireless communication channels. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A power management circuit comprising:
   at least one energy storage device; and
   a power controller coupled to the at least one energy storage device, the power controller configured to:
   enable temporary power to be provided from the at least one energy storage device to a plurality of data storage devices upon a system power loss event; and
   receive a power loss indication signal from any individual one of the plurality of data storage devices and responsively enable power loss protection for the data storage device.

2. The power management circuit of claim 1 and wherein the at least one energy storage device comprises at least one capacitor.

3. The power management circuit of claim 2 and wherein the at least one energy storage device further comprises at least one battery that serves as a backup energy storage device for delivering the temporary power when the capacitor is in a substantially discharged state.

4. The power management circuit of claim 1 and further comprising a power failure detection circuit configured to detect the system power loss event and responsively notify the power controller of the system power loss event.

5. The power management circuit of claim 1 and further comprising an interrupt control circuit configured to receive a power loss indication signal and responsively notify the power controller.

6. The power loss management circuit of claim 1 and wherein the power loss indication signal comprises a device detachment indication signal that alerts the power loss management circuit of imminent electrical disconnection of the data storage device.

7. The power loss management circuit of claim 1 and further comprising a bank of switches controlled by the power controller to selectively provide the temporary power to different ones of the plurality of data storage devices.

8. The power loss management circuit of claim 1 and further comprising a plurality of power failure instruction buses coupled to the power controller and configured to transport instruction signals from the power controller to the plurality of data storage devices.

9. The power loss management circuit of claim 8 and wherein the instruction signals comprise low-power mode instruction signals and cache flushing instruction signals.

10. A method comprising:
    detecting a system power loss event and responsively enabling temporary power to be provided from at least one energy storage device to at least one of a plurality of data storage devices; and receiving a power loss indication signal from any individual one of the plurality of data storage devices and responsively enabling power loss protection for the data storage device.

11. The method of claim 10 and further comprising sending a cache flushing instruction to the at least one of the plurality of data storage devices.

12. The method of claim 10 and further comprising sending a low-power mode instruction to the at least one of the plurality of data storage devices.

13. The method of claim 10 and further comprising:
designating a first subset of the plurality of data storage devices as high priority data storage devices; and
designating at least a second subset of the plurality of data storage devices as low priority data storage devices.

14. The method of claim 13 and wherein enabling temporary power to be provided from at least one energy storage device to at least one of a plurality of data storage devices comprises enabling the temporary power to be provided to the first subset of the data storage devices.

15. The method of claim 13 and further comprising not enabling the temporary power to be provided to the second subset of the plurality of data storage devices.

16. A system comprising:
a plurality of data storage devices with each data storage device having a main memory and a cache memory; and a power management circuit coupled to each of the plurality of data storage devices, the power management circuit configured to:
detect a system power loss event that results in a reduction of power supplied to the plurality of data storage devices and responsively provide the plurality of data storage devices with temporary power that enables the plurality of data storage devices to flush volatile data from individual ones of the plurality of cache memories into respective individual ones of the plurality of main memories; and
receive a power loss indication signal from any individual one of the plurality of data storage devices and responsively enable power loss protection for the data storage device.

17. The system of claim 16 and further comprising a plurality of carriers for the plurality of data storage devices.

18. The system of claim 17 and wherein each of the plurality of carriers comprises a drive detachment-enabling feature configured to move between a first position and a second position in which an electromechanical switch is activated to send the power loss indication signal to the power management circuit.

19. The system of claim 16 and wherein power management circuit further comprises a primary energy storage device and a backup energy storage device.

20. The system of claim 19 and wherein the primary energy storage device comprises a capacitor and the backup energy storage device comprises a battery.

* * * * *